Figure 1:
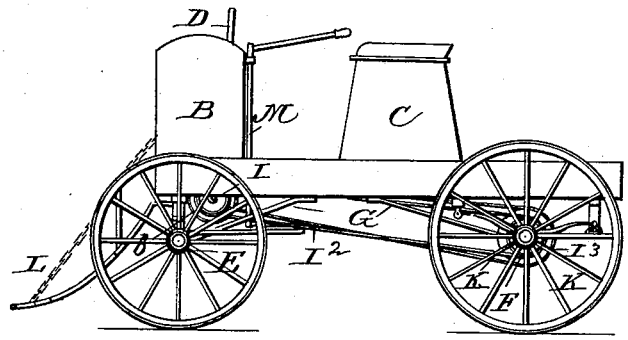

(No Model.)

G. H. GRENLICH.
MOTOR VEHICLE.

No. 591,398.  Patented Oct. 12, 1897.

Witnesses
F. L. Ourand
C. H. Mason

Inventor,
George H. Grenlich
by John Wedderburn
Attorney

United States Patent Office.

GEORGE H. GRENLICH, OF CINCINNATI, OHIO.

MOTOR-VEHICLE.

SPECIFICATION forming part of Letters Patent No. 591,398, dated October 12, 1897.

Application filed August 14, 1896. Serial No. 602,789. (No model.)

*To all whom it may concern:*

Be it known that I, GEORGE H. GRENLICH, a citizen of the United States, residing at Cincinnati, in the county of Hamilton and State of Ohio, having invented certain new and useful Improvements in Motor-Vehicles; and I do hereby declare the following to be a full, clear, and exact description of the invention, such as will enable others skilled in the art to which it appertains to make and use the same.

This invention relates to certain new and useful improvements in steering mechanism for motor-vehicles; and it has for its objects, among others, to provide a simple and cheap construction of electrically-propelled vehicle that can be easily guided and which will require but little attention on the part of the operator. The parts are few in number and those compactly arranged and not liable to get out of order.

Other objects and advantages of the invention will hereinafter appear, and the novel features thereof will be specifically defined by the appended claims.

The invention in this instance resides in the peculiar combinations and the construction, arrangement, and adaptation of parts, all as more fully hereinafter described, shown in the drawings, and then particularly pointed out in the claims.

The invention is clearly illustrated in the accompanying drawings, which, with the letters of reference marked thereon, form a part of this specification, and in which—

Figure 2:
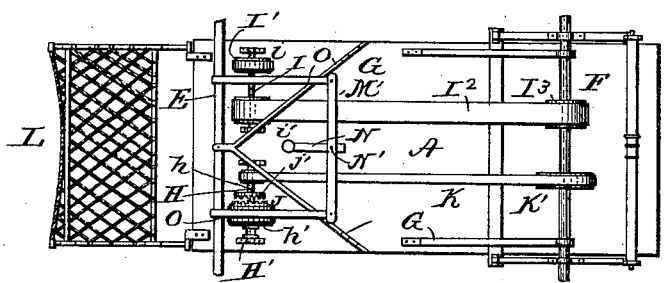
Figure 3:
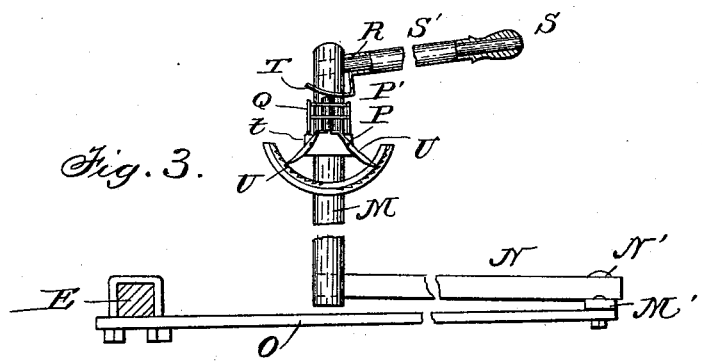

Figure 1 is an elevation of my improved motor-vehicle. Fig. 2 is a bottom plan thereof. Fig. 3 is an enlarged detail of the steering mechanism.

Like letters of reference indicate like parts throughout the several views.

Referring now to the details of the drawings by letter, A designates the floor or platform of the truck. It may be of any desired length, and at the forward end thereof is supported the box or case B for containing the dynamo, motor, or storage batteries.

C is the seat, supported within convenient reach of the said box or casing, so that the operator can have the device completely under his control, D being the lever by which the dynamo is thrown into or out of operation, and the steering-lever also being so disposed as to be manipulated from this seat.

E is the front axle, and F the rear axle. The body of the vehicle is supported upon suitable springs, as shown, and the braces G may or may not be present, as may be required.

H and I are shafts suitably mounted on the under side of the platform or floor. They are disposed beneath the motor-box, and on the shaft H is the pulley $h$ and the larger pulley $h'$, which is movable endwise on the axle and has fast thereto one half $j$ of the clutch, the other half $j'$ being fast on the axle, as shown. On the other side of the pulley $h'$ is the annularly-grooved collar or boss H', into which engages the fork of the lever D, so that when the latter is moved the clutch may be thrown into or out of operative position to start or stop the dynamo. On the shaft I are the two pulleys $i$ and $i'$, as shown. Around the pulley $i$ passes a belt I' from the motor, and around the other pulley $i'$ passes a belt I$^2$, which extends to and around a pulley I$^3$ on the rear axle, as shown.

K is a belt running over the pulley K' on the rear axle for running the dynamo.

At the front of the vehicle I have shown a fender L, but this may be dispensed with, if desired.

The guiding or steering is accomplished as follows: M is a vertical rod extending down through the floor of the vehicle, as shown, and to the lower end thereof is fast a horizontal rod or bar N, to the rear end of which is a pin N', from which is suspended a transverse bar or lever M', from opposite ends of which extend the rods O to the front axle, as clearly shown in Fig. 3.

P is a bracket or cap secured to the motor-box, and on this cap is secured the slide or guides P', on which is mounted to slide the block or slide Q, which is actuated by the turning of the handle R. This handle is a rod connected at one end with the vertical rod or shaft M, and on this is the outer sleeve, having a handle portion S, which is free to revolve with the sleeve S' on the rod for about a quarter-revolution. To this sleeve is fastened the curved arm T, which is arranged above the slide or block Q and is designed to press down upon the same when the handle is turned.

U are pawls or catches pivoted at $t$ on the cap or bracket P and designed to engage in the teeth or ratchets of the curved plate V, the teeth or notches of which extend in opposite directions from the central line, as shown. The free ends of these pawls or catches are bent horizontally and arranged beneath the sliding block or slide, as shown.

It is evident that instead of belts chains might sometimes be employed.

What is claimed as new is—

1. The combination with the motor-box and the front axle, of the cap on said box, the slide thereon, the pivoted catches and the handle, all as set forth.

2. The combination with the front axle and the motor-box, of the cap on said box, the slide, its guide, the pivoted catches and the notched curved bar and the handle and the curved arm carried thereby, substantially as specified.

3. The combination with the vertical rod and the handle, of the curved arm carried by the handle, the slide, the pivoted catches arranged to be actuated by said slide and the curved notched bar, all substantially as specified.

In testimony whereof I have signed this specification in the presence of two subscribing witnesses.

GEORGE H. GRENLICH.

Witnesses:
 JOSEPH LANG,
 HARMAN H. MEYER.